(12) United States Patent
Köhler et al.

(10) Patent No.: US 12,535,374 B2
(45) Date of Patent: Jan. 27, 2026

(54) SENSOR FOR PARALLEL MEASUREMENT OF PRESSURE AND ACCELERATION AND USE OF THE SENSOR IN A VEHICLE BATTERY

(71) Applicant: Infineon Technologies AG, Neubiberg (DE)

(72) Inventors: Daniel Köhler, Chemnitz (DE); Vlad Buiculescu, Bucharest (RO); Florian Brandl, Maxhütte-Haidhof (DE); Dirk Meinhold, Dresden (DE); Erhard Landgraf, Dresden (DE); Rainer Markus Schaller, Saal a.d. Donau (DE); Markus Eckinger, Regenstauf (DE)

(73) Assignee: Infineon Technologies AG, Neubiberg (DE)

( * ) Notice: Subject to any disclaimer, the term of this patent is extended or adjusted under 35 U.S.C. 154(b) by 639 days.

(21) Appl. No.: 17/934,057

(22) Filed: Sep. 21, 2022

(65) Prior Publication Data
US 2023/0102575 A1 Mar. 30, 2023

(30) Foreign Application Priority Data

Sep. 28, 2021 (DE) .......................... 102021125081.1
Oct. 7, 2021 (DE) .......................... 102021126000.0

(51) Int. Cl.
*G01L 19/00* (2006.01)
*B60L 58/10* (2019.01)
(Continued)

(52) U.S. Cl.
CPC .......... *G01L 19/0092* (2013.01); *B60L 58/10* (2019.02); *G01P 1/00* (2013.01); *G01P 15/08* (2013.01)

(58) Field of Classification Search
CPC .... G01L 19/0092; B60L 58/10; B60L 3/0046; B60L 2240/545; B60L 50/64; G01P 1/00;
(Continued)

(56) References Cited

U.S. PATENT DOCUMENTS 5,353,644 A * 10/1994 Frank .................. G01P 15/0922
73/714
5,361,635 A * 11/1994 Woodruff ................ G01P 15/18
73/514.18
(Continued)

FOREIGN PATENT DOCUMENTS

DE        4229487 A1    3/1994
DE    102013100673 A1    7/2013
(Continued)

OTHER PUBLICATIONS

A. Y. Ahmed et al., "Analytical modeling of mass-sensitive gas sensor based on MEMS resonator," 2011 National Postgraduate Conference, Perak, Malaysia, 2011, pp. 1-3, doi: 10.1109/NatPC.2011.6136422. (Year: 2011).*

(Continued)

*Primary Examiner* — Michael J Dalbo
*Assistant Examiner* — Denise R Karavias
(74) *Attorney, Agent, or Firm* — Harrity & Harrity, LLP

(57) ABSTRACT

A sensor for parallel measurement of pressure and acceleration of a vehicle, including a substrate, a sensor element disposed on the substrate, a material being connected with the sensor element and being exposed to the environment of the sensor, wherein the material is configured to act as a seismic mass, and an electronic circuitry connected with the sensor element and including a first filter and a second filter, wherein the first and second filters have different filter characteristics so that an output of the first filter is representative for the pressure and an output of the second is representative for the acceleration.

19 Claims, 3 Drawing Sheets

(51) Int. Cl.
*G01P 1/00* (2006.01)
*G01P 15/08* (2006.01)

(58) Field of Classification Search
CPC ............. G01P 15/08; G01P 2015/0837; G01P 2015/0865
See application file for complete search history.

(56) References Cited

U.S. PATENT DOCUMENTS

| | | | |
|---|---|---|---|
| 2004/0239341 A1* | 12/2004 | Aoyagi | G01P 15/125 324/661 |
| 2007/0229294 A1* | 10/2007 | Vossmeyer | G01N 33/0047 340/636.19 |
| 2014/0176149 A1* | 6/2014 | Mizoguchi | G01R 31/396 324/434 |
| 2017/0168087 A1* | 6/2017 | Gafforelli | G01P 15/125 |
| 2019/0064201 A1* | 2/2019 | Tanaka | B81B 3/0018 |

FOREIGN PATENT DOCUMENTS

| | | | | |
|---|---|---|---|---|
| DE | 102013204527 A1 | * | 9/2014 | ......... B60L 11/1857 |
| DE | 102020113561 A1 | * | 11/2020 | ............ G01C 21/16 |

OTHER PUBLICATIONS

Koch et al., "Fast Thermal Runaway Detection for Lithium-Ion Cells in Large Scale Traction Batteries," Batteries, 2018, vol. 4, No. 16, 11 pages.

* cited by examiner

SENSOR FOR PARALLEL MEASUREMENT OF PRESSURE AND ACCELERATION AND USE OF THE SENSOR IN A VEHICLE BATTERY

CROSS REFERENCE TO RELATED APPLICATIONS

This application claims priority to German Patent Application No. 102021125081.1, filed on Sep. 28, 2021, and German Patent Application No. 102021126000.0, filed on Oct. 7, 2021, the contents of which are incorporated by reference herein in their entirety.

TECHNICAL FIELD

The present disclosure is related to a sensor for parallel measurement of pressure and acceleration of a vehicle, and a use of such a sensor in a battery system of the vehicle.

BACKGROUND

Electric vehicles are known to be equipped with large-scale lithium-ion batteries. In such batteries a phenomenon is known which is called thermal runaway and which is a well-known risk that can lead to critical situations if no counter measures are taken. Fast and reliable detection of faulty battery cells undergoing thermal runaway within the lithium-ion battery is therefore a key factor in the construction of such batteries for comprehensive passenger safety.

When a lithium-ion cell goes into thermal runaway, a variety of effects occur at the cell, One of the most common effects is the loss of cell voltage. Another effect is direct heat coming from the self-heating of the cell caused by internal chemical reactions of the anode, cathode and electrolyte. A further effect is the production of gas due to these chemical reactions. This gas generation causes a build-up of internal pressure which leads to swelling of the cell and can result in rupture of the cell encapsulation.

One way of early detection of thermal runaway could therefore be to detect an increase of the static pressure in the environment of a battery cell which would mean to add a pressure sensor to the battery system. However, it is a general aim not to incorporate too many sensors in the battery system as the available space is limited.

It should be added that thermal runaway is not limited to batteries with lithium-ion cells but is also reported for some supercapacitors and could therefore as well be a problem in battery systems containing supercapacitors.

A further safety item is the integrity of the battery with respect to physical impacts caused by collision or maintenance events. There is a strong interest to detect acceleration shocks above a certain level, e.g. 20 g, which may harm the battery integrity. Therefore a sensor for acceleration shock detection would be helpful for monitoring these kind of events.

For these and other reasons there is a need for the present disclosure.

SUMMARY

A first aspect of the present disclosure is related to a sensor for parallel measurement of pressure and acceleration of a vehicle, including a substrate, a sensor element disposed on the substrate, a material being connected with the sensor element and being exposed to the environment of the sensor, wherein the material is configured to act as a seismic mass, and an electronic circuitry connected with the sensor element and including a first filter and a second filter, wherein the first and second filters have different filter characteristics so that an output of the first filter is representative for the pressure and an output of the second is representative for the acceleration.

A second aspect of the present disclosure is related to a use of a sensor according to the first aspect in a vehicle battery or an airbag.

BRIEF DESCRIPTION OF THE DRAWINGS

The accompanying drawings are included to provide a further understanding of implementations and are incorporated in and constitute a part of this specification. The drawings illustrate implementations and together with the description serve to explain principles of implementations. Other implementations and many of the intended advantages of implementations will be readily appreciated as they become better understood by reference to the following detailed description.

The elements of the drawings are not necessarily to scale relative to each other. Like reference numerals designate corresponding similar parts.

DETAILED DESCRIPTION

In the following detailed description, reference is made to the accompanying drawings, which form a part hereof, and in which is shown by way of illustration specific implementations in which the disclosure may be practiced. In this regard, directional terminology, such as "top", "bottom", "front", "back", "leading", "trailing", etc., is used with reference to the orientation of the Figure(s) being described. Because components of implementations can be positioned in a number of different orientations, the directional terminology is used for purposes of illustration and is in no way limiting. It is to be understood that other implementations may be utilized and structural or logical changes may be made without departing from the scope of the present disclosure. The following detailed description, therefore, is not to be taken in a limiting sense, and the scope of the present disclosure is defined by the appended claims.

It is to be understood that the features of the various example implementations described herein may be combined with each other, unless specifically noted otherwise. Identical reference numbers refer to the same or similar components.

As employed in this specification, the terms "bonded", "attached", "connected", "coupled" and/or "electrically connected/electrically coupled" are not meant to mean that the elements or layers must directly be contacted together; intervening elements or layers may be provided between the "bonded", "attached", "connected", "coupled" and/or "electrically connected/electrically coupled" elements, respectively. However, in accordance with the disclosure, the above-mentioned terms may, optionally, also have the specific meaning that the elements or layers are directly contacted together, e.g. that no intervening elements or layers are provided between the "bonded", "attached", "connected", "coupled" and/or "electrically connected/electrically coupled" elements, respectively.

Further, the word "over" used with regard to a part, element or material layer formed or located "over" a surface may be used herein to mean that the part, element or material layer be located (e.g. placed, formed, deposited, etc.) "indirectly on" the implied surface with one or more additional parts, elements or layers being arranged between the implied surface and the part, element or material layer. However, the word "over" used with regard to a part, element or material layer formed or located "over" a surface may, optionally, also have the specific meaning that the part, element or material layer be located (e.g. placed, formed, deposited, etc.) "directly on", e.g. in direct contact with, the implied surface.

Figure 1A:
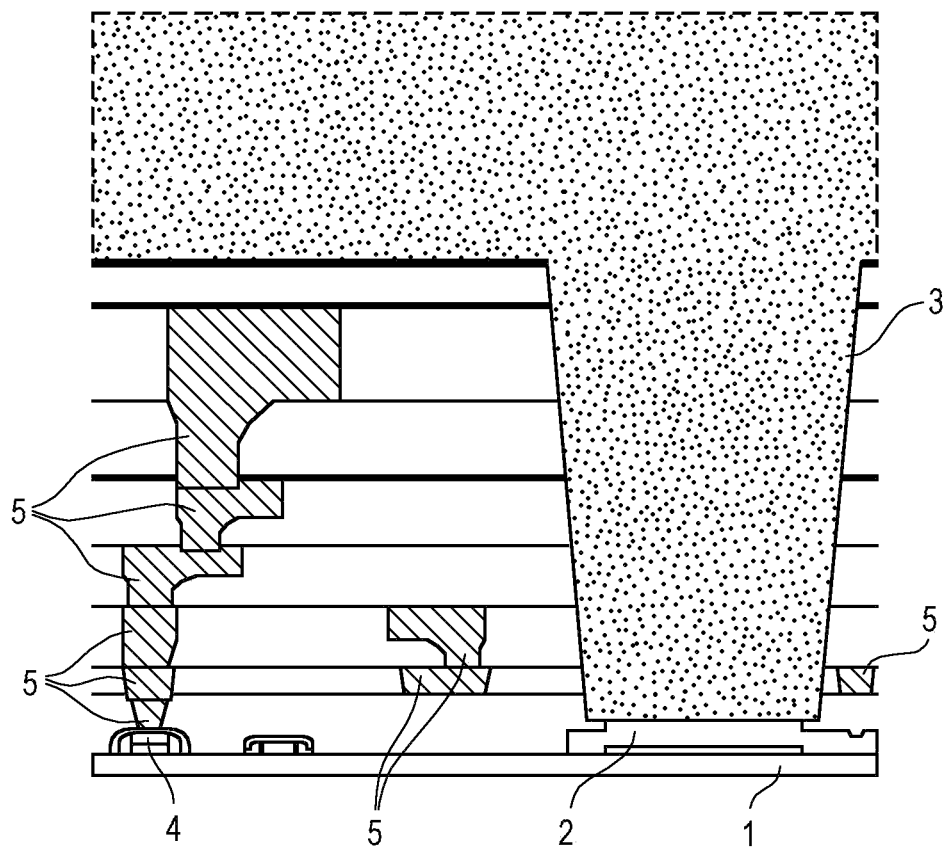
FIGS. 1A and 1B show a cross-section of an example of a sensor element of a sensor according to the first aspect (A) and an example of the electronic circuitry connected with the sensor element (B).
Figure 1B:
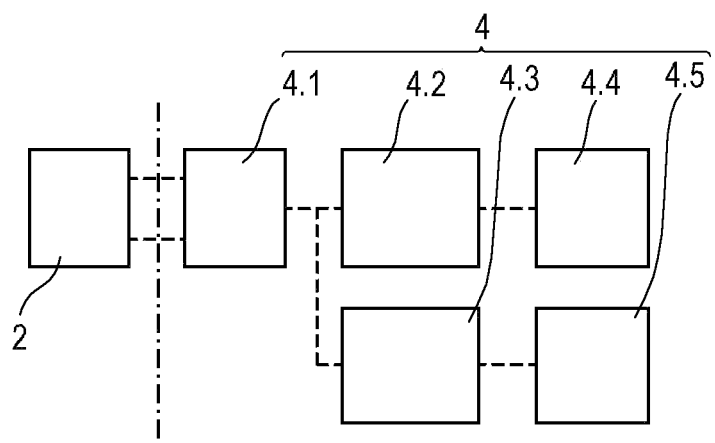

FIGS. 1A and 1B show an example of a semiconductor device according to the first aspect in a view from above (A) and a perspective view (B).

The sensor 10 according to FIG. 1A comprises a substrate 1 and a sensor element 2 disposed on the substrate 1. The sensor element 2 may comprise a membrane, in particular a membrane based on polycrystalline silicon, in particular in the form of a micro-electro-mechanical sensor (MEMS). A material 3 is resting on the sensor element 2 and is exposed to the environment of the sensor 10. The material 3 is configured to act as a seismic mass and also to protect the sensor element. The material 3 may comprise a viscoelastic material, in particular one or more of a polymer, an amorphous polymer, a semicrystalline polymer, a biopolymer, and a gel.

The sensor 10 further comprises an electronic circuitry 4 which is shown in further detail in FIG. 1B. The electronic circuitry 4 is connected with the sensor element 2 and comprises a first filter 4.2 and a second filter 4.3, wherein the first and second filters 4.2 and 4.3 have different filter characteristics so that an output of the first filter 4.2 is representative for the pressure and an output of the second 4.3 is representative for the acceleration.

More specifically, the first filter 4.2 may be a low pass filter and the second filter 4.3 may be a high pass filter or a bandpass filter. The first filter 4.2 may comprise an upper cutoff frequency which is lower than a lower cutoff frequency of the second filter 4.3.

Even more specifically, the first filter 4.2 can be a low pass filter comprising a cutoff frequency at the high frequency side which cutoff frequency can be in a range from 0.05 kHz to 0.2 kHz, in particular be around 0.1 kHz. The output of the first filter 4.2 is thus representative for the pressure as only a rather slowly varying signal can pass through the first filter 4.2.

Furthermore the second filter 4.3 can be a high pass filter or a band pass filter comprising a cutoff frequency at the low frequency side which cutoff frequency can be in a range from 0.4 kHz to 0.6 kHz, in particular be around 0.5 kHz. The output of the second filter 4.3 is thus representative for the acceleration as only a rather fast varying signal can pass through the second filter 4.3.

In case of the second filter 4.3 being a band pass filter 4.3, it may comprise a band pass frequency range from 0.4 kHz to 20 kHz, in particular from 0.5 kHz to 15 kHz.

The electronic circuitry 4 may further comprise an analog/digital converter (ADC) 4.1 which can be connected with an output of the sensor element 2. An output of the ADC 4.1 can be split so that the output signal can be delivered to input ports of the first and second filters 4.2 and 4.3. The first filter 4.2 and the second filter 4.3 are thus configured as digital filters.

The electronic circuitry 4 further comprises a first registering device 4.4 connected to an output of the first filter 4.2 for registering the signal filtered by the first filter 4.2, and a second registering device 4.5 connected to an output of the second filter 4.3 for registering the signal filtered by the second filter 4.3.

As shown in FIGS. 1A and 1B, the electronic circuitry 4 can be integrated together with the sensor element 2 in one semiconductor device and can be electrically connected with the sensor element via an electrical connection structure 5 embedded in the semiconductor device.

Another possible implementation would be to provide a first filter comprising a first cutoff frequency and a second filter in the form of another low pass filter comprising a second cutoff frequency which is higher than the first cutoff frequency of the first filter.

To summarize the essence, the solution is a single sensing cell for pressure and acceleration using a defined mass of a gel (or any other soft covering material which does not destroy the sensor functionality) covering the membrane. The signal separation principle is based on the fact that the time behavior of pressure and acceleration signal is different during use. Typically, pressure signals are relatively slow in change whereas acceleration signals are much faster.

Hereby the solution to separate the pressure from the acceleration signals is an appropriate filter design in the subsequent signal path. The analog sensor signal delivered by the sensor element 2 is converted into the digital domain by an analog-digital-converter (ADC with rather high bandwidths. Then the signal path is split into a digital low pass filter path for the pressure signal and a second signal path with a digital bandpass or high pass filter path for the acceleration signal. Slow pressure transients will be damped by bandpass/high pass and therefore the bandpass of high pass filter path will provide the acceleration signal purely. In the low pass filter path the high frequency acceleration signal is damped by the low pass filter while the pressure signal remains.

This is further illustrated with the examples as shown in the following FIGS. 2A and 2B.

Figure 2A:
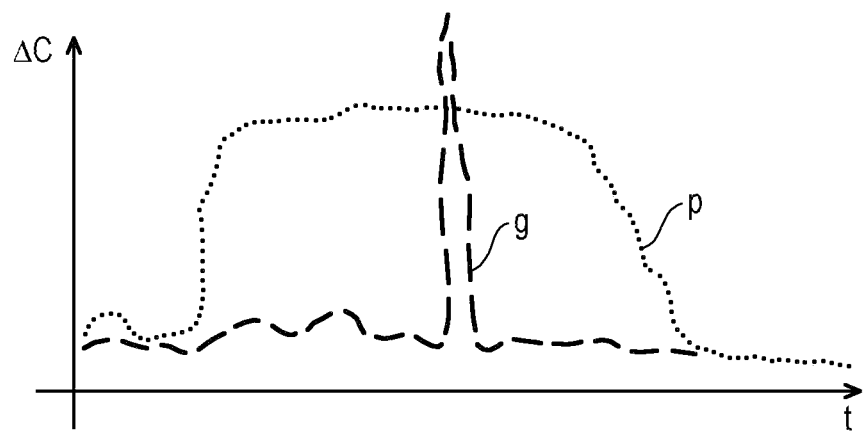
FIGS. 2A and 2B depict a diagram showing the change of the capacity over time (A) and another diagram showing the magnitude of the signal over the frequency (B).
Figure 2B:
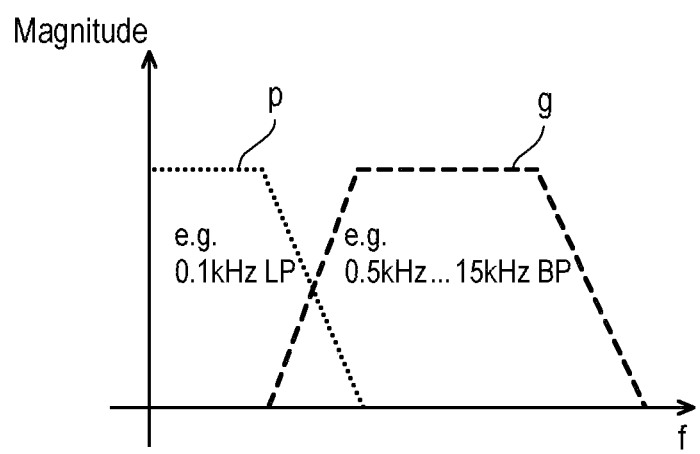

FIGS. 2A and 2B depict a diagram showing the change of the capacity over time (A) and another diagram showing the magnitude of the signal over the frequency (B).

More specifically, FIG. 2A shows two signal courses one of which designated with the letter "p" represents the pressure and the other one of which designated with the letter "g" represents the acceleration. It can be seen that the "p" curve shows a typical slowly varying behaviour consisting of an increase at the beginning, a rather long lasting plateau and a decrease at the end. On the other hand, the "g" curve shows a typical quickly varying behaviour consisting of only a sharp and fast peak caused by, for example, a quick movement of the vehicle.

Furthermore FIG. 2B shows the two schematic and example filter characteristics of the first and second filters. In this example the first filter is a low pass filter and the second filter is a bandpass filter. The filter characteristic of the first filter is designated with the letter "p" and the filter characteristic of the second filter is designated with the letter "g". It can be seen that the "p" curve comprises a cutoff frequency at around 0.1 kHz and the "g" curve shows a bandpass range from around 0.5 kHz to around 15 kHz.

As a result, the "p" signal of FIG. 2A will pass through the first "p" filter, but will be suppressed or at least strongly attenuated by the second "g" filter. On the other hand the "g" signal of FIG. 2A will pass through the second "g" filter, but will be suppressed or at least strongly attenuated by the first "p" filter.

Figure 3A:
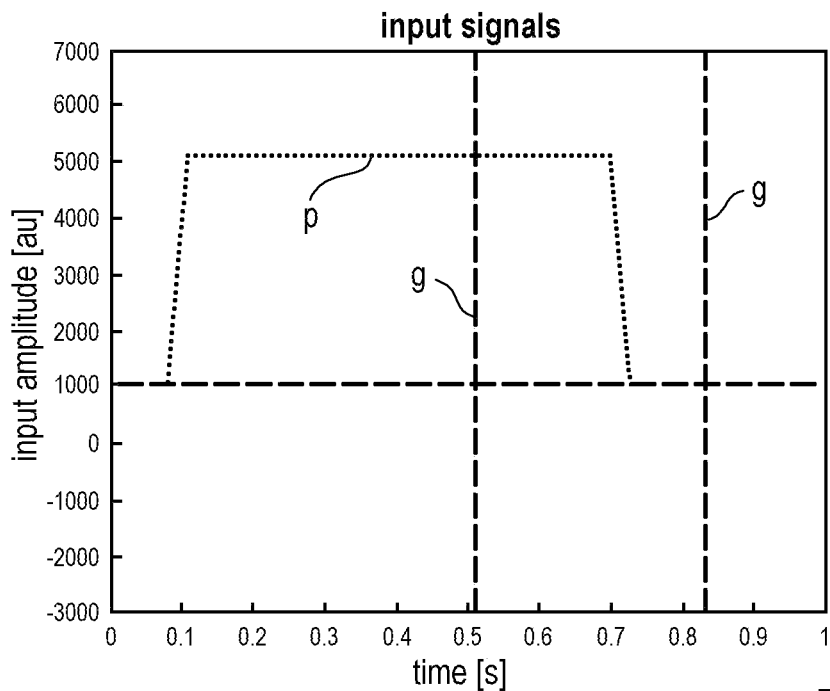
FIGS. 3A and 3B show the results of a simulation by depicting a diagram showing input signal curves over time (A) and another diagram showing the amplitude of the filtered signals over time.
Figure 3B:
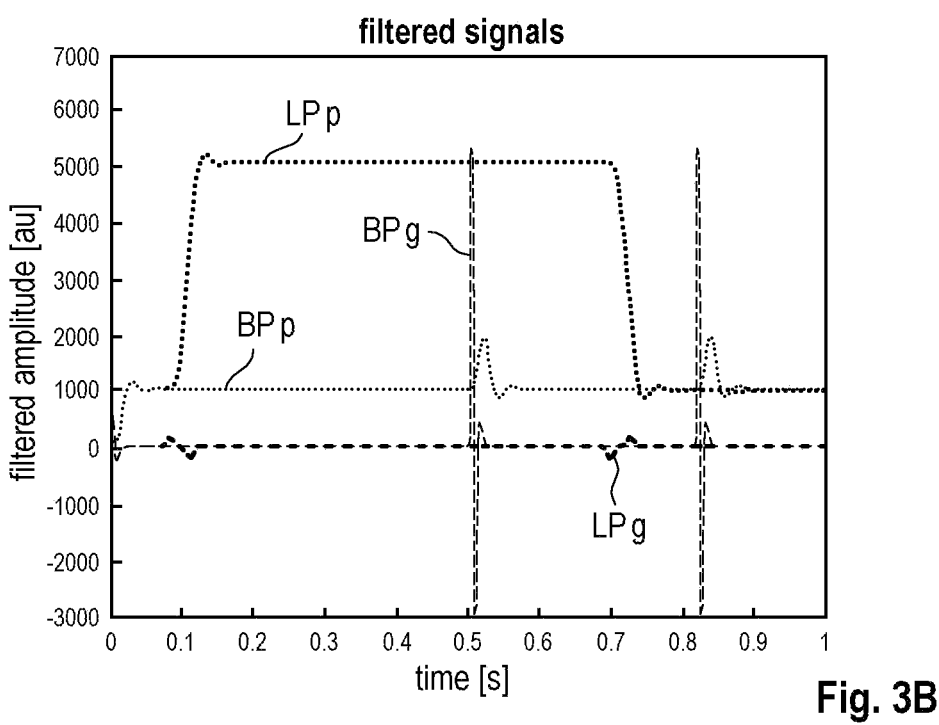

FIGS. 3A and 3B show the results of a simulation by depicting a diagram showing input signal curves over time (A) and another diagram showing the amplitude of the filtered signals over time.

More specifically, FIG. 3A shows two signal courses one of which designated with the letter "p" represents the pressure and the other one of which designated with the letter "g" represents the acceleration. Similar to FIG. 2A it can be seen that the simulated "p" curve shows a typical slowly varying behaviour consisting of an increase at the beginning, a rather long lasting plateau and a decrease at the end. On the other hand, the simulated "g" curve shows a typical quickly varying behaviour consisting only two sharp peaks caused by, for example, two quick movements of the vehicle. These signal curves are mathematically transmitted through the first and second filters with filter characteristics as shown in FIG. 2B.

The result is shown in FIG. 3B in the form of the simulated filtered signals. The four curves belong to the following filtered signals. The curve designated as "LP p" is the p signal filtered by the first low pass filter 4.2. The curve designated as "LP g" is the g signal filtered by the first low pass filter 4.2. The curve designated as "BP p" is the p signal filtered by the second band pass filter 4.3. And finally the curve designated as "BP g" is the g signal filtered by the second band pass filter 4.3.

It can clearly be seen that the "unwanted" signals "LP g" and "BP p" are very low in amplitude as compared with the respective "wanted" signals "LP p" and "BP g". Hence the first and second filters 4.2 and 4.3 are successfully performing in strongly attenuating the respective unwanted signals.

It can further be seen in the simulated filtered signals in FIG. 3B that the amplitudes of the "wanted" signals "LP p" and "BP g" are of the same order of magnitude which is in fact another desirable result. In practice it depends on the seismic mass of the material 3 being sufficiently high so that the output of the bandpass filter 4.3 provides a measurable signal. In numerical terms, this can mean, for example, that mass of the material 3 may be chosen so high that the amplitude of the signal "BP g" is not less than 50%, 30%, or 10% than the amplitude of the signal "LP p".

The sensor element 2 and the electronic circuitry 4 can be monolithically integrated in one semiconductor device. In particular, the electronic circuitry 4 of FIGS. 1A and 1B can be implemented in form of an application-specific integrated circuit (ASIC) which can be monolithically integrated in one semiconductor device as shown in FIGS. 1A and 1B. However, it is also possible that the sensor element is integrated in a first semiconductor device and the electronic circuitry, in particular in the form of an ASIC, is integrated in a second semiconductor device.

The sensor 10 as described above can be used in a battery of an electric vehicle, wherein the battery can be a large-scale lithium ion battery. The gas sensor can in particular be part of a battery monitoring system.

The sensor 10 as described above can also be used in an airbag of the vehicle.

EXAMPLES

In the following specific examples of the present disclosure are described.

Example 1 is a sensor for parallel measurement of pressure and acceleration of a vehicle, comprising a substrate, a sensor element disposed on the substrate, a material being connected with the sensor element and being exposed to the environment of the sensor, wherein the material is configured to act as a seismic mass, and an electronic circuitry connected with the sensor element and comprising a first filter and a second filter, wherein the first and second filters have different filter characteristics so that an output of the first filter is representative for the pressure and an output of the second is representative for the acceleration.

Example 2 is the semiconductor package according to Example 1, in which the first filter is a low pass filter comprising a first cutoff frequency.

Example 3 is the semiconductor package according to Example 1 or 2, in which the second filter is a high pass filter or a band pass filter.

Example 4 is the semiconductor package according to 3, in which the first filter comprises an upper cutoff frequency lower than the lower cutoff frequency of the high pass filter or the bandpass filter.

Example 5 is the semiconductor package according to Example 2, in which the second filter is another low pass filter comprising a second cutoff frequency which is higher than the first cutoff frequency.

Example 6 is the semiconductor package according to to anyone of the preceding Examples, in which the material comprises a viscoelastic material.

Example 7 is the semiconductor package according to Example 6, in which the viscoelastic material (3) comprises one or more of a polymer, an amorphous polymer, a semicrystalline polymer, a biopolymer, and a gel.

Example 8 is the semiconductor package according to any one of the preceding Examples, in which the seismic mass of the material is sufficiently high so that the output of the bandpass filter provides a measurable signal.

Example 9 is the semiconductor package according to any one of the preceding Examples, in which the electronic circuitry comprises an analog/digital converter which is connected with an output of the sensor element, and the first filter and the second filter are configured as digital filters.

Example 10 is the semiconductor package according to any one of the preceding Examples, in which the sensor element comprises a micro-electro-mechanical sensor (MEMS).

Example 11 is the semiconductor package according to any one of the preceding Examples, in which the sensor element comprises a membrane wherein the material covers the membrane.

Example 12 is the semiconductor package according to any one of the preceding claims, further comprising an ASIC which includes the electronic circuitry.

Example 13 is the semiconductor package according to any one of the preceding Examples, in which the sensor element and the electronic circuitry are monolithically integrated in one semiconductor device.

Example 14 is the semiconductor package according to any one of Examples 1 to 12, in which the sensor element is integrated in a first semiconductor device and the electronic circuitry is integrated in a second semiconductor device.

Example 15 is a use of a sensor according to any one of Examples 1 to 14 in a battery of the vehicle.

Example 16 is the use of a sensor according to Example 15, wherein the battery is a large-scale lithium ion battery.

Example 17 is the use of a sensor according to Example 15 or 16, wherein the gas sensor is part of a battery monitoring system.

Example 18 is the use of a sensor according to any one of Examples 1 to 14 in an airbag of the vehicle.

In addition, while a particular feature or aspect of an implementation of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that implementations of the disclosure may be implemented in discrete circuits, partially integrated circuits or fully integrated circuits or programming means. Also, the term "example" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific implementations have been illustrated and described herein, it will be appreciated by those of ordinary skill in the art that a variety of alternate and/or equivalent implementations may be substituted for the specific implementations shown and described without departing from the scope of the present disclosure. This application is intended to cover any adaptations or variations of the specific implementations discussed herein. Therefore, it is intended that this disclosure be limited only by the claims and the equivalents thereof.

The invention claimed is:

1. A sensor for parallel measurements of pressure and acceleration, comprising:
   a substrate;
   a sensor element disposed on the substrate and comprising a membrane;
   a material being mechanically coupled with the sensor element and being exposed to an environment of the sensor, wherein the material covers the membrane, wherein the material is configured to act as a seismic mass, wherein the material has a property that is sensitive to the pressure and to the acceleration that affects an interaction of the material with the sensor element, and wherein the sensor element is configured to generate a sensor signal based on the interaction of the material with the sensor element; and
   electronic circuitry connected to the sensor element and comprising a first filter and a second filter, the first filter and the second filter both being configured to receive an electrical signal derived from the sensor signal, wherein:
      the first filter and the second filter have different filter characteristics so that an output of the first filter is representative of the pressure and an output of the second filter is representative of the acceleration.

2. The sensor according to claim 1, wherein:
the first filter is a low pass filter comprising a first cutoff frequency.

3. The sensor according to claim 1, wherein:
the second filter is a high pass filter or a band pass filter.

4. The sensor according to claim 1, wherein:
the first filter is a low pass filter comprising an upper cutoff frequency and the second filter is a high pass filter or a band pass filter having a lower cutoff frequency,
   wherein the upper cutoff frequency of the low pass filter is less than the lower cutoff frequency of the high pass filter or the band pass filter such that a first passband of the first filter and a second passband of the second filter are mutually exclusive of each other.

5. The sensor according to claim 2, wherein:
the second filter is another low pass filter comprising a second cutoff frequency that is higher than the first cutoff frequency.

6. The sensor according to claim 1, wherein:
the material comprises a viscoelastic material.

7. The sensor according to claim 6, wherein:
the viscoelastic material comprises one or more of a polymer, an amorphous polymer, a semicrystalline polymer, a biopolymer, or a gel.

8. The sensor according to claim 1, wherein:
the seismic mass provided by the material is sufficiently high so that the output of the second filter provides a measurable signal.

9. The sensor according to claim 1, wherein:
the electronic circuitry comprises an analog-to-digital converter that is connected to an output of the sensor element for converting the sensor signal into the electrical signal, and
the first filter and the second filter are configured as digital filters.

10. The sensor according to claim 1, wherein:
the sensor element comprises a micro-electro-mechanical sensor (MEMS).

11. The sensor according to claim 1, wherein:
the sensor element and the electronic circuitry are monolithically integrated in one semiconductor device.

12. The sensor according to claim 1, wherein:
the sensor element is integrated in a first semiconductor device and the electronic circuitry is integrated in a second semiconductor device.

13. The sensor of claim 1, wherein the first filter and the second filter are electrically coupled to the sensor element in parallel such that the first filter receives the electrical signal at a first filter input of the first filter and the second filter receives the electrical signal at a second filter input of the second filter.

14. The sensor of claim 1, wherein the output of the first filter is insensitive to the acceleration and the output of the second filter is insensitive to the pressure.

15. A vehicle, comprising:
a sensor for parallel measurements of pressure and acceleration of a vehicle, the sensor comprising:
   a substrate;
   a sensor element disposed on the substrate and comprising a membrane;
   a material being mechanically coupled with the sensor element and being exposed to an environment of the sensor, wherein the material covers the membrane, wherein the material is configured to act as a seismic mass, wherein the material has a property that is sensitive to the pressure and to the acceleration that affects an interaction of the material with the sensor element, and wherein the sensor element is configured to generate a sensor signal based on the interaction of the material with the sensor element; and electronic circuitry connected to the sensor element and comprising a first filter and a second filter, the first filter and the second filter both being configured to receive an electrical signal derived from the sensor signal, wherein:

the first filter and the second filter have different filter characteristics so that an output of the first filter is representative of the pressure and an output of the second filter is representative of the acceleration.

16. The vehicle according to claim 15, further comprising: a battery, wherein the sensor is arranged in the battery.

17. The vehicle according to claim 16, wherein: the battery is a large-scale lithium ion battery.

18. The vehicle according to claim 15, further comprising: a battery; and a battery monitoring system, wherein the sensor is a gas sensor that is part of the battery monitoring system.

19. The vehicle according to claim 15, further comprising: an airbag, wherein the sensor is arranged in the airbag.

\* \* \* \* \*